Feb. 2, 1926.
J. F. O'CONNOR
1,571,686
ALIGNING DEVICE FOR PEDESTAL JOURNAL BOXES
Filed Oct. 25, 1923
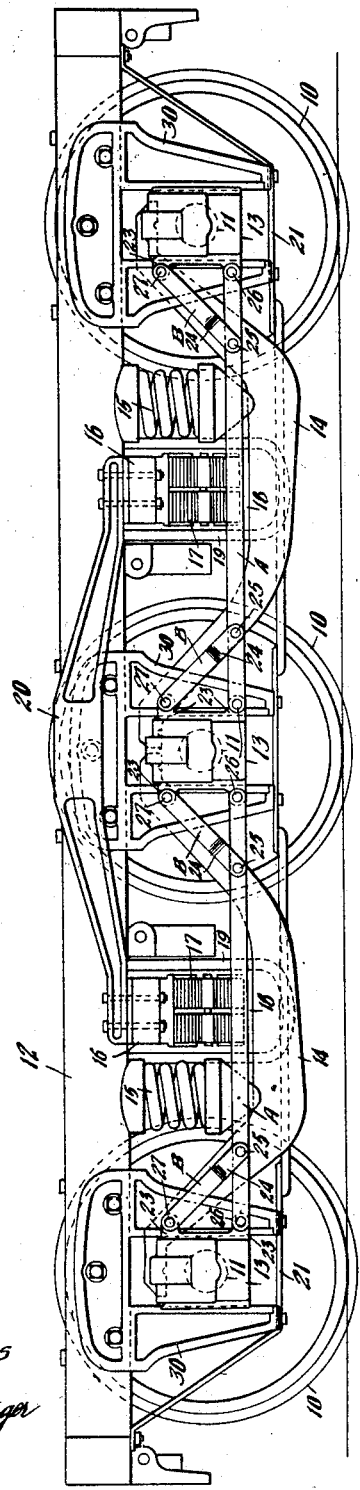
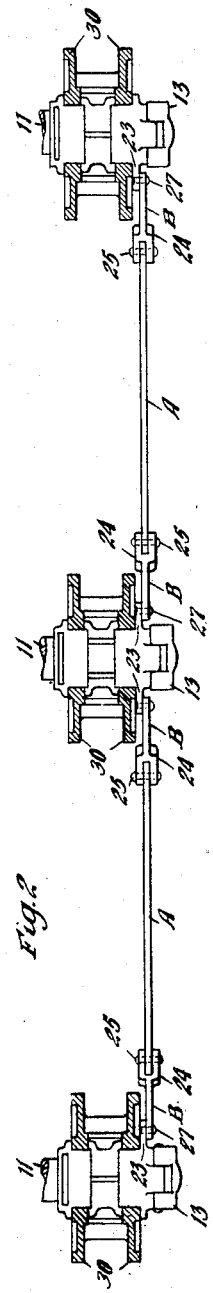
Inventor
John F. O'Connor
By George J. Haight
Atty.

Patented Feb. 2, 1926.

1,571,686

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ALIGNING DEVICE FOR PEDESTAL JOURNAL BOXES.

Application filed October 25, 1923. Serial No. 670,714.

*To all whom it may concern:*

Be it known that I, JOHN F. O'CONNOR, a citizen of the United States, residing at Chicago, in the county of Cook and State of Illinois, have invented a certain new and useful Improvement in Aligning Devices for Pedestal Journal Boxes, of which the following is a full, clear, concise, and exact description, reference being had to the accompanying drawings, forming a part of this specification.

This invention relates to improvements in alining devices for pedestal journal boxes.

In the operation of railway cars, and especially those having six-wheel trucks, great difficulty is experienced in maintaining the proper alinement of the journal boxes, there being a tendency for the boxes to tilt in the guides of the pedestals. The tilting of the boxes in the guides causes rapid wear and gouging, rendering the guides and boxes worthless and requiring frequent replacements. The number of actual replacements required are exceedingly large and, therefore, a source of unnecessarily large expenditure to the railways.

One object of my invention is to provide simple and efficient means, auxiliary to the usual box guides, for maintaining alinement of the pedestal journal boxes of railway cars.

More specifically the object of my invention is to provide a bracing structure secured to and extending between the different journal boxes of a truck to maintain the proper alinement of the same and to thereby minimize wear on the boxes and guides.

Other objects and advantages of the invention will more clearly appear from the description and claims hereinafter following.

In the drawing, forming a part of this specification, Figure 1 is a side elevational view of a six-wheel truck illustrating my improvements in connection therewith. And Figure 2 is a horizontal sectional view through the pedestals at one side of the truck illustrated in Figure 1, the journal boxes being shown in plan and the other parts of the truck proper being omitted.

In said drawing, 10—10 indicates the wheels, 11—11 the axles and 12 the truck frame of a common form of six-wheel truck The frame 12 has pedestals 30 depending therefrom between the legs of which are guided for vertical movement journal boxes 13—13, in which the axles are journaled in the usual manner. Bearing on the upper ends of the journal boxes 13 are the usual equalizer bars 14—14. Equalizer springs 15—15, provided with the usual caps and seats, are interposed between the truck frame and the equalizer bars. The truck bolsters, indicated at 16, are supported by bolster springs 17—17 mounted on the spring planks 18—18 suspended from the truck frame by spring hangers 19—19. The truck bolsters carry the usual side bearing arches 20 which have the opposite ends thereof secured to the bolsters. The lower ends of the pedestals are connected by the tie bars 21—21.

In carrying out my invention, I employ at each side of the truck a plurality of tie rods A—A and bracing links B—B connecting the journal boxes, there being two tie rods A and four braces B employed at each side of the six-wheel truck, as shown, each of the tie rods being provided with two braces B, one at each end of the same. Each of the braces B is secured to the corresponding tie rod at a point inwardly from the end thereof and extends diagonally therefrom. The tie rods A extend in opposite directions from the central journal box toward the front and rear of the truck, below the projecting ends of the springs 17 so as to clear the same, one end of each of the rods and the brace at said end being secured to the central journal box and the opposite ends and the corresponding braces being connected to the end journal boxes.

Although the bars and braces may be secured to the journal boxes in any suitable manner, I preferably provide each of the journal boxes with top and bottom lugs 23—23 to which the free ends of the tie rods and braces are secured, the center journal box at each side of the truck being provided with four such lugs, two at the front and two at the rear side thereof, and the front and rear boxes being each provided with two such lugs, the front box having the lugs on the rear side thereof and the rear box having the lugs on the front side. In actual practice all boxes may be made with four lugs so as to permit interchange.

Each of the rods A is in the form of a flat bar. The links B are also in the form of flat bars, each forked at one end as indicated at 24, thereby providing a pair of arms adapted to straddle the bar and secured to the latter by a rivet 25 extending through alined openings in the arms and the tie bar. As shown, the opposite ends of the tie rods are connected to the bottom lugs 23 and the free ends of the links B are connected to the top lugs 23 of the journal boxes, each end of each tie rod being secured to the corresponding lower lug 23 by a rivet 26 extending through the rod and lug and the free end of each link being secured to the corresponding top lug 23 by a rivet 27 extending therethrough. Each of the diagonally extending links B forms a rigid brace between the journal box secured to the corresponding end of the tie rod so that there can be no material tilting of the box with reference to the attached rod and each tie rod in turn prevents much tilting of the attached boxes with reference to each other. The boxes on each side of the truck are thus all tied together to prevent serious relative tilting movement of the same. Limited relative vertical movement of the boxes is permited by slight flexing of the tie rods. It will be evident that each individual journal box is prevented from freely tilting through its connection with the other journal boxes. In other words, tilting of each box on its axis is practically prevented, while at the same time the necessary relative vertical play due to the undulations of the rails is permitted.

From the preceding description considered in connection with the drawings, it will be seen that the means which I have provided for reducing tilting or turning of the journal boxes, are inexpensive, may be easily applied, and avoid all interference with the usual parts of the truck so that the common practices need not be varied. By preventing unlimited individual turning or tilting of the journal boxes, great economies are effected in maintenance. Heretofore, to minimize the effect of individual turning or tilting of the journal boxes many relatively expensive expedients have been employed, such as insertion of hardened metal liners between the boxes and pedestal guides and the formation of special wear-resisting inserts in the pedestal guides and in the sides of the boxes, but these have proven ineffective since, if the boxes are permitted to tilt, they remain tilted one way, and the corners thereof will soon gouge and wear down the metal even on case-hardened surfaces.

In the drawings, I have illustrated one embodiment of the invention, but I am aware that the invention may be embodied in different manners, the essential feature being the provision of means between two adjacent boxes, so arranged as to limit the individual turning or tilting of either box.

I have herein shown and described what I now consider the preferred manner of carrying out my invention but the same is merely illustrative and I contemplate all changes and modifications that come within the scope of the claims appended hereto.

I claim:

1. In a truck, the combination with a plurality of journal boxes on each side thereof; of pedestals for guiding said journal boxes for vertical movement; and means tying said boxes at each side of said truck together for preventing relative tilting movement of the same.

2. In a truck, the combination with a plurality of journal boxes at each side thereof; guide means for said boxes; and additional means independent of the truck for bracing said boxes to prevent tilting thereof.

3. In a truck, the combination with a plurality of journal boxes on each side of the truck in which the wheel axles are journaled; of guides for said boxes; and braces extending between adjacent boxes tying the same together to prevent tilting thereof on the axles journaled therein.

4. In a truck, the combination with a central and two-end journal boxes on each side of the truck having the wheel axles journaled therein; of guides for said boxes; and braces extending from the central journal box to each of said end journal boxes, said braces being rigidly secured to said boxes.

5. In a truck, the combination with a central and two-end journal boxes on each side of the truck having the wheel axles journaled therein; of guides for said boxes; tie rods connecting said central box to said end boxes; and braces at each end of each tie rod extending diagonally from said rod to the corresponding box.

6. In a truck, the combination with a plurality of journal boxes on each side of the truck; of guides for said boxes; a tie rod connecting the adjacent boxes on each side of the truck, each of said tie rods having the opposite ends thereof secured to the lower ends of the boxes; and braces at the opposite ends of each tie rod, each brace having one end secured to the rod and the other end secured to the corresponding journal box near the top.

7. In a truck for railway cars and the like, having a plurality of pedestal guides and journal boxes associated with said guides and adapted for free vertical movement therein, means extending between the two adjacent boxes and attached thereto so as to maintain parallelism between said boxes whereby independent tilting of either box is prevented.

In witness that I claim the foregoing I hereunto subscribe my name this 22nd day of October 1923.

JOHN F. O'CONNOR.